J. R. OSTOLAZA.
MOTOR VEHICLE.
APPLICATION FILED JAN. 26, 1917.
1,322,725.
Patented Nov. 25, 1919.
2 SHEETS—SHEET 2.
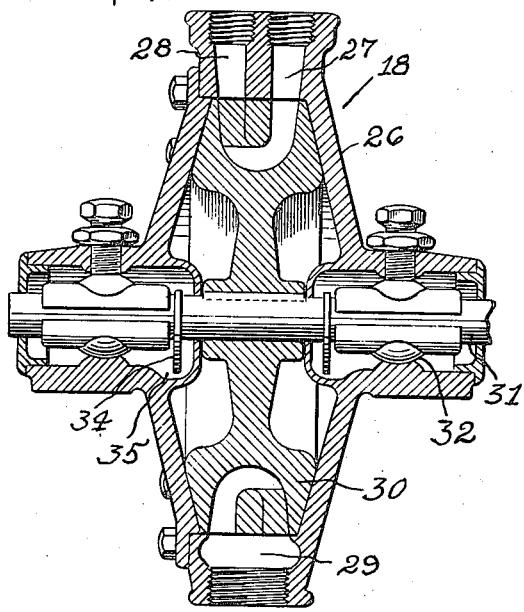
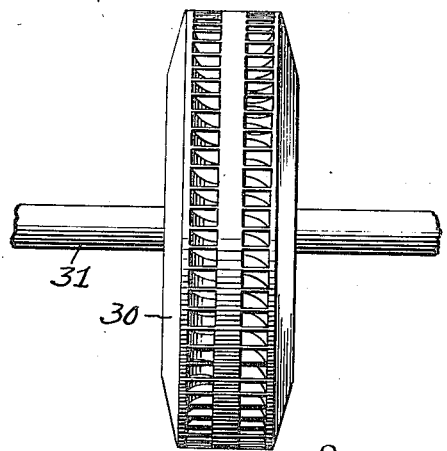
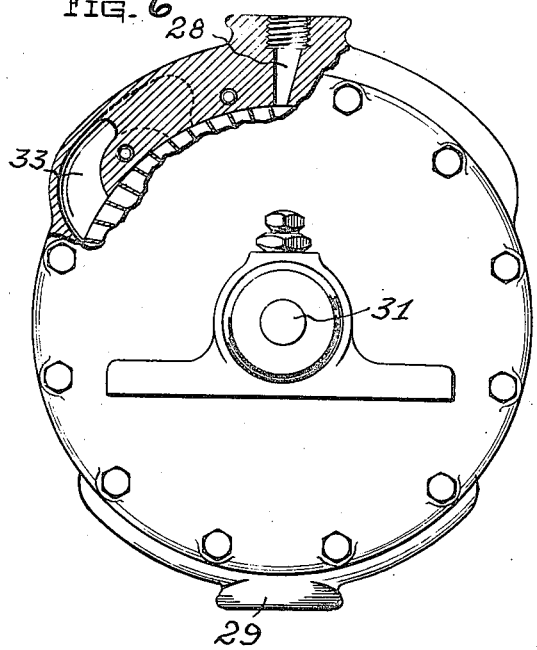
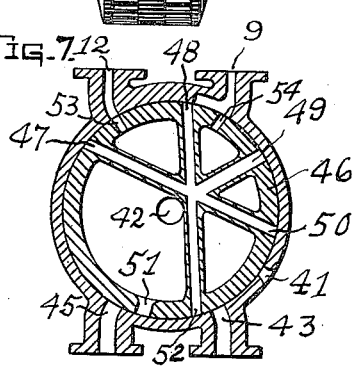
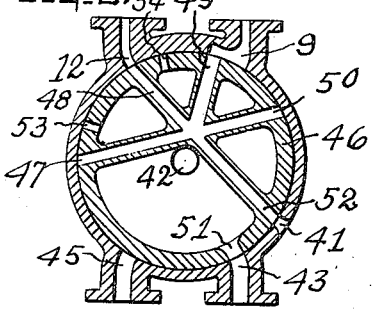
INVENTOR:
Justo Rivas Ostolaza
By James W. Master
His Attorney

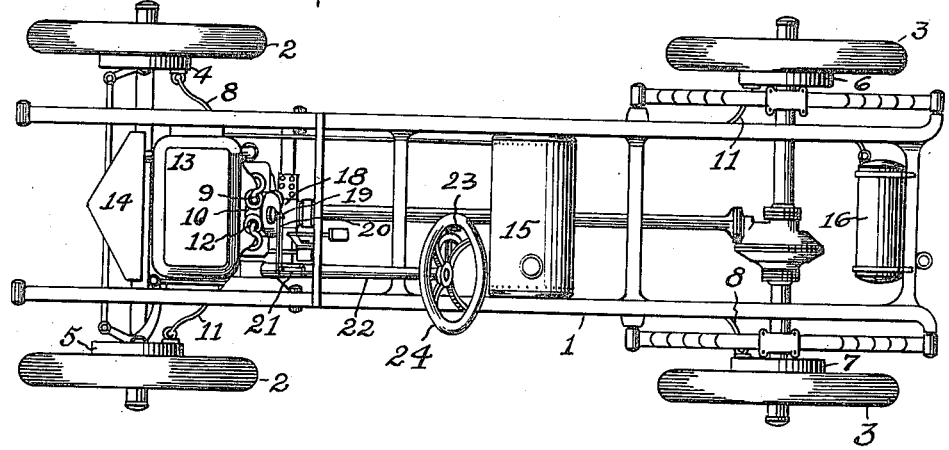
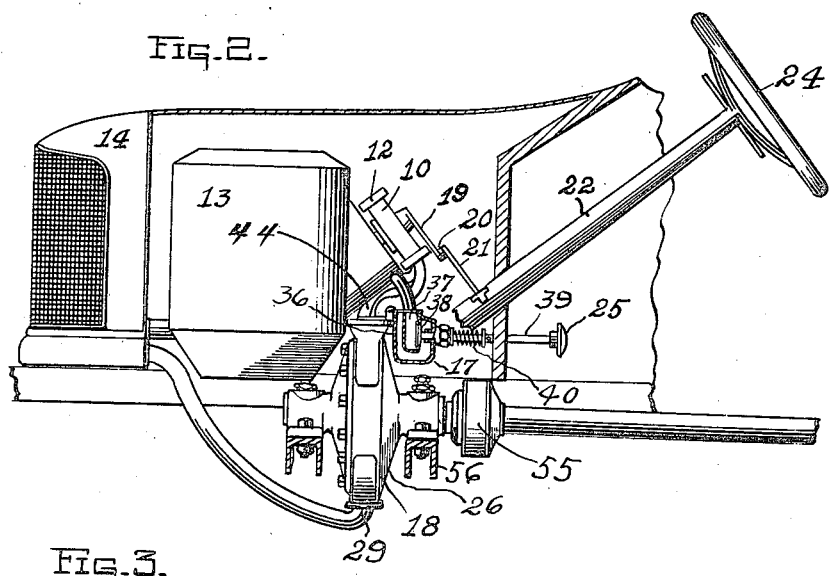
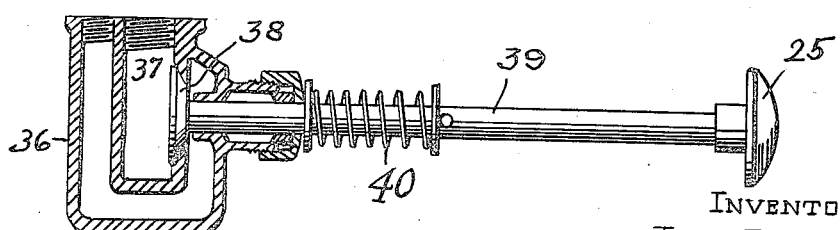
INVENTOR:
Justo Rivas Ostolaza.
His Attorney

_UNITED STATES PATENT OFFICE._

JUSTO RIVAS OSTOLAZA, OF LOS ANGELES, CALIFORNIA.

MOTOR-VEHICLE.

1,322,725.

Specification of Letters Patent.    Patented Nov. 25, 1919.

Application filed January 26, 1917. Serial No. 144,799.

_To all whom it may concern:_

Be it known that I, JUSTO RIVAS OSTOLAZA, a subject of the King of Spain, residing at Los Angeles, in the county of Los Angeles and State of California, have invented new and useful Improvements in Motor-Vehicles, of which the following is a specification.

This invention has reference to improvements in motor vehicles, and more particularly to a new and novel means of propulsion therefor.

The principal objects of the present invention are, to adapt a prime motive power to the operation of the motor vehicle, whereby complex mechanical parts are avoided, whereby increased flexibility and steady power are secured, and whereby the control and operation of the vehicle are obtained, with reduced vibration, less noise, and less physical effort is required in manipulating the means of control.

Prior to this invention, the highest development of motor vehicle consisted of the combination with an internal-explosive prime mover of preferably twelve cylinders, including their parts, electric or mechanical starter therefor, clutches, combination of gears and gear shifting mechanism, electric spark and timing devices, complicated circulating and cooling devices, and complicated system of lubrication, of a multiplicity of levers and other means of control.

With the present invention, the complications, difficulties, and objections incident to a motor car operated by internal-explosive means, are overcome and avoided; there being combined with a steam driven prime mover having one moving part with only two bearings, a simple lubrication means, simple means for generation of steam, simple accelerative and efficient braking means, and a combined throttle and brake valve, controlled by a lever within reach of the operator's hand while operating the steering wheel, and having a slight range of movement, whereby the motor vehicle may be positively and efficiently controlled, operated, and handled, with variable speed and variable loads, and without shaking, rattling, overheating, or stalling, or any of the faults inherent to explosive motors and motive means.

Other objects and advantages may appear from the subjoined detail description.

The principles herein related may be embodied to comprehend any suitable mechanism in which the operative elements may be driven by the application of an elastic fluid medium, in either direction, to accomplish the propulsion and control of a motor vehicle. To this end, the invention includes in combination, a steam generative plant, a reversible steam turbine, steam actuated braking means, and a valve to control the application and distribution of the steam to the operative elements, together with a simple manual control for the valve.

In the drawings: Figure 1 is a plan of the chassis of a motor vehicle to which my invention has been applied. Fig. 2 is a fragmental elevation of the motor vehicle, showing the relative position of parts. Fig. 3 is a sectional detail of the throttle-valve. Fig. 4 is a transverse sectional elevation of the turbine motor. Fig. 5 is an end elevation of the rotor. Fig. 6 is a side elevation of the turbine motor with parts broken away to show application of steam to the rotor. Fig. 7 is a sectional detail of the manually operated valve to control the distribution of steam to the motor and brakes; being shown in braking position. Fig. 8 is a sectional detail of the control valve in position to apply steam to the motor.

Referring to the drawings, the automobile chassis 1, has mounted thereon the front wheels 2 and rear wheels 3; the front wheels being provided with brake drums 4, 5, and the rear wheels being provided with brake drums 6, 7. The brakes are steam actuated; the right front brake 4 and left rear brake 7 being connected by the pipe 8 with port 9 of the valve 10, and the left front brake 5 and right rear brake 6, being connected by pipe 11, with port 12, in valve 10.

The power generating plant consists of the boiler 13, the condenser 14, the water supply tank 15, the fuel tank 16, the distributing and controlling valve 10, throttle valve 17, the reversible steam turbine 18, and suitable connecting pipes therefor (not shown).

The valve member 10 is actuated by a lever 19, connected by link 20, with lever 21, which is fixed to a tube (not shown) within the steering post 22, which is rotated by the lever 23, subimposed relative to steering wheel 24, and manipulated by the driver while still retaining his grip upon the steering wheel. The throttle valve 17 has an independent connection with the boiler, and is actuated through the foot pedal 25, whereby prompt acceleration and variable speed is attained, thereby especially adapting the vehicle to city traffic.

The steam turbine 18, consists of a casing 26, provided at the top with inlet ports 27, 28, and at the bottom with an exhaust port 29. The rotor 30 is fixed to the shaft 31, journaled in spherical bearings 32, to secure alinement of bearings and shaft. The rotor 30 is provided on its periphery with U-shaped diagonally disposed impact blades forming a series of passages for the steam. The steam enters the passages on one side of the periphery of the rotor, through the corresponding inlet ports, and, as may be understood from the disclosure in Fig. 6, emerges on the opposite side of the periphery, and discharges into the supplementary port 33, and is again directed to impinge upon the rotor on the side of the periphery as first described. The turbine is reversed in direction of rotation by admitting steam through the opposite inlet port. The steam admitted through either port, is twice used to deliver impulses to the rotor, thereby securing economy in the generation of power. The bearings are lubricated by rings 34 running in oil pockets 35.

The throttle valve shown in Fig. 3, consists of the valve casing 36, having therein the pressure chamber 37, into which a valve member 38, of bevel disk form, opens. The valve is actuated by the plunger 39, on which is mounted the foot pedal 25; a spring 40, normally holding the valve in closed position.

The valve shown in Figs. 7, 8, is employed to control the admission of steam to the motor and to the brakes. The casing is provided with the port 9 through which steam may be admitted to diagonally opposite brakes 4, 7, and with a port 12 to admit steam pressure to the brakes 5, 6. Exhaust port 41 is provided to release the pressure upon the brakes when the valve is shifted to release position. Steam is admitted to the valve through the opening 42, in direct communication with the boiler. Port 43 is provided to control the admission of steam to the motor, having communication through a manifold 44, with the forward inlet port 27, of the motor. Reverse port 45, of the valve, is similarly in communication with reverse port 28, of the motor. The inner rotating valve member 46, is provided with tubular passages 47, 48, 49, 50, having no communication with the interior of the valve. The port 51 is adapted to register with either port 43, or port 45, to supply steam pressure to the motor. The valve, when set as shown in Fig. 8, supplies steam pressure to impart a forward motion to the vehicle. In this position the passages 48, 49, are, respectively, in communication with brake ports 9, 12, and the passage 52 registers with exhaust port 41, thereby releasing the brakes. In the brake position shown in Fig. 7, the ports 53, 54, are respectively, in communication with brake ports 9, 12, thereby applying the brakes to the vehicle. To drive the vehicle in reverse position, the port 51 is placed in communication with port 45. In this position of the valve, passages 47, 48, register with brake ports 9, 12, and port 50, with exhaust port 41, to release the brakes.

From the foregoing it may be seen that I have produced a simple and efficient power plant for the propulsion of motor vehicles. The boiler is placed under the hood, and as far away from the passengers as possible. The boiler is close to the turbine motor with a simple control valve and manifold interposed, so that but little steam is lost through evaporation. The turbine can be readily reversed by a single movement of the valve controlled by the fingers of the driver. Practically no oil gets into the steam and it can be condensed and used over and over again without being separated. The turbine takes up but little room, and requires almost no attention. The turbine is geared to the drive shaft in the ratio of say, 4 to 1; the transmission gear box 55, being directly at the rear of the turbine. No clutches are necessary. Gears are always in mesh, and any ratio of gears may be employed to secure the desired flexibility, ease of acceleration, and other qualities desired.

The turbine motor is mounted on crossbars 56, of the vehicle frame. While the specification is more or less specific as to certain of the parts, the invention resides in the combination of parts, their simplicity, and their adaptability to accomplish the objects of the invention.

What is claimed is:

1. In a steam operative system for motor vehicles, steam turbine driving means, steam generating means, steam brake means for each wheel connected for simultaneous operation of the brakes on diagonally opposite wheels, a steam distributing valve consisting of a casing having five ports, a movable valve member within the casing having three ports, an opening in the valve member having constant communication with the steam generating means, a multi-tubular manifold within the valve member having five intercommunicating passages adapted to register with the ports in the casing and operative to a neutral position, to forward motor driving position, to reverse motor driving position, to brake position for two of the wheels, to brake position for the alternate two wheels, to emergency brake position for all wheels, and manual means for actuating the valve to the operative positions.

2. In a steam operative system for motor vehicles, a turbine motor driving means, a brake means for each wheel connected so that the brakes on diagonally opposite wheels are simultaneously operative, and a control valve for the steam distribution, comprising a casing having five ports, a rotating valve member within the casing having three ports, a multi-tubular manifold within the valve member having five intercommunicating passages adapted to register with the ports in the casing, and manual means for actuating the valve, whereby the steam may be applied to drive the vehicle forward, to drive the vehicle in reverse direction, to apply brakes to two of the wheels, to apply brakes to the alternate pair of wheels, or to apply brakes to all of the wheels simultaneously, in accordance with the position of the valve.

In testimony whereof, I hereunto affix my signature, this 20th day of January, in the year 1917.

JUSTO RIVAS OSTOLAZA.

Witnesses:
J. A. BERNAL,
FREDERIC M. KEENEY.